US010459905B2

(12) United States Patent
Floyd et al.

(10) Patent No.: US 10,459,905 B2
(45) Date of Patent: Oct. 29, 2019

(54) CENTRALIZED HIERARCHICAL CONFIGURATION SYSTEM FOR APPLICATIONS IN A DISTRIBUTED NETWORK

(71) Applicant: Bank of America Corporation, Charlotte, NC (US)

(72) Inventors: Rodney Shannon Floyd, Cumming, GA (US); Yifei Zhu, Alpharetta, GA (US)

(73) Assignee: Bank of America Corporation, Charlotte, NC (US)

( * ) Notice: Subject to any disclaimer, the term of this patent is extended or adjusted under 35 U.S.C. 154(b) by 388 days.

(21) Appl. No.: 14/990,394

(22) Filed: Jan. 7, 2016

(65) Prior Publication Data

US 2017/0201598 A1    Jul. 13, 2017

(51) Int. Cl.
*G06F 17/30* (2006.01)
*G06F 16/22* (2019.01)
(Continued)

(52) U.S. Cl.
CPC ...... *G06F 16/2282* (2019.01); *G06F 16/2246* (2019.01); *G06F 16/282* (2019.01);
(Continued)

(58) Field of Classification Search
CPC ......... G06F 17/30339; G06F 17/30589; G06F 17/30864; G06F 16/284; G06F 16/285; G06F 16/2246; G06F 16/2228
See application file for complete search history.

(56) References Cited

U.S. PATENT DOCUMENTS

| 6,792,426 B2 | 9/2004 | Baumeister et al. |
| 6,938,041 B1 | 8/2005 | Brandow et al. |

(Continued)

FOREIGN PATENT DOCUMENTS

| EP | 2761452 A2 | 8/2014 |
| JP | 2010009145 A | 1/2010 |
| WO | 0219063 A2 | 3/2002 |

OTHER PUBLICATIONS

"21 Deployment Configuration File and Properties", retrieved from Internet Nov. 30, 2015, website URL: https://docs.oracle.com/javase/8/docs/technotes/guides/deploy/properties.html, pp. 1-12.
(Continued)

*Primary Examiner* — Ashish Thomas
*Assistant Examiner* — Jedidiah P Ferrer
(74) *Attorney, Agent, or Firm* — Banner & Witcoff, Ltd.; Michael A. Springs

(57) ABSTRACT

Systems are provided for configuring applications in a distributed environment to enable more granular customization of application behavior. A centralized hierarchical configuration data store may be used to store configurations corresponding to a multi-level hierarchical model. The distributed environment may include a plurality of applications hosted by a plurality of application servers, where the application servers and/or applications are associated with an environment, an instance, and a category. The plurality of applications may load and apply configurations via a configuration control engine from the centralized hierarchical configuration data store based on the environment, instance, and category associated with the applications.

11 Claims, 3 Drawing Sheets

(51) Int. Cl.
  *G06F 16/28* (2019.01)
  *G06F 16/951* (2019.01)
  *H04L 29/08* (2006.01)

(52) U.S. Cl.
  CPC .......... *G06F 16/285* (2019.01); *G06F 16/951* (2019.01); *H04L 67/141* (2013.01); *H04L 67/2842* (2013.01)

(56) References Cited

U.S. PATENT DOCUMENTS

| | | | |
|---|---|---|---|
| 7,107,284 B1* | 9/2006 | Betz | G06F 17/212 707/999.001 |
| 7,519,600 B1 | 4/2009 | Zenz | |
| 7,730,076 B2* | 6/2010 | Guenther | G06F 16/2428 707/750 |
| 7,752,463 B2* | 7/2010 | Hahn | G06F 21/73 711/100 |
| 8,230,384 B1* | 7/2012 | Krishnan | G06F 17/3007 707/601 |
| 8,606,765 B2* | 12/2013 | Boggs | G06F 16/219 707/695 |
| 2005/0015513 A1* | 1/2005 | Tran | H04W 8/22 709/246 |
| 2005/0038868 A1 | 2/2005 | Spicer | |
| 2006/0161895 A1* | 7/2006 | Speeter | G06F 8/71 717/121 |
| 2010/0269158 A1* | 10/2010 | Ehler | G06F 16/9535 726/4 |
| 2015/0142934 A1* | 5/2015 | Craine | H04L 41/0806 709/221 |
| 2017/0004203 A1* | 1/2017 | Pandit | G06F 16/316 |

OTHER PUBLICATIONS

"Postgresql JDBC Driver—Connecting to the Database", retrieved from Internet Nov. 30, 2015, website URL: https://jdbc.postgresql.org/documentation/head/connect.html, pp. 1-7.

"How to: Set Up a Data Source Within Tomcat 6.0 Using Oracle Universal Connection Pool", by Pas Apicella, retrieved from Internet Nov. 30, 2015, website URL: http://www.oracle.com/technetwork/articles/oem//ucp-jdbc-tomcat-355431.html, pp. 1-4.

"Apache Tomcat 4, JNDI Datasource How-To", retrieved from Internet Nov. 30, 2015, website URL: https://tomcat.apache.org/tomcat-4.1-doc/jndi-datasource-examples-howto.html, pp. 1-9.

\* cited by examiner

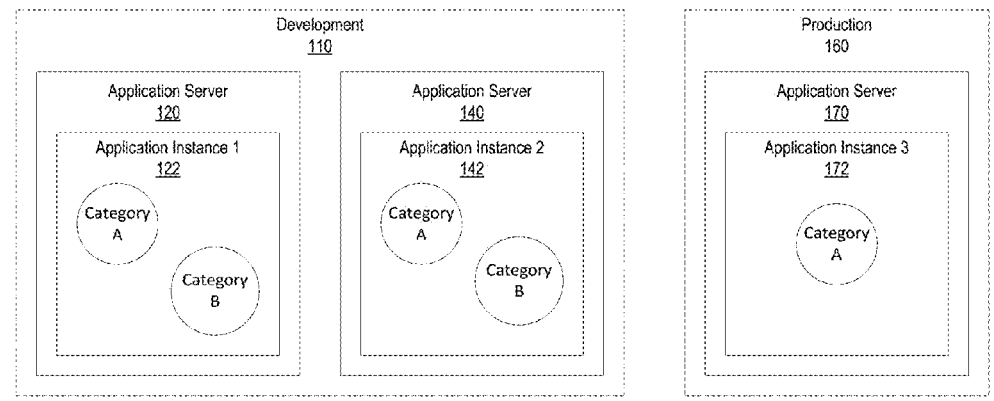

CENTRALIZED HIERARCHICAL CONFIGURATION SYSTEM FOR APPLICATIONS IN A DISTRIBUTED NETWORK

BACKGROUND

Organizations, such as corporate entities, education institutions, government agencies, and/or other large enterprise organizations, may host numerous applications in a distributed network. These organizations may provide mechanisms to associate configurations with applications, such that the configurations control the behaviors of the applications. However, using current mechanisms, applications running in different environments, applications of a certain type, and/or different instances of the same application may be limited to using the same configurations. As such, a need has been recognized to manage configurations at a more granular level.

SUMMARY

In light of the foregoing background, the following presents a simplified summary in order to provide a basic understanding of some aspects of the disclosure. The summary is not an extensive overview of the disclosure. It is neither intended to identify key or critical elements of the disclosure nor to delineate scope of the disclosure. The following summary merely presents some concepts of the disclosure in a simplified form as a prelude to the description below.

An illustrative example described herein provides a centralized hierarchical configuration system. The centralized hierarchical configuration system may include a centralized hierarchical configuration data store and an application having at least one processor and memory storing computer-readable instructions, that when executed by the at least one processor, may cause the application to load a plurality of server settings from an application server to obtain data store connection settings to the centralized hierarchical configuration data store, load a plurality of application settings to obtain an application environment, an application instance, and an application category associated with the application, and establish a data store connection to the centralized hierarchical configuration data store using the data store connection settings via a communication interface of the application server. The application may then, by a configuration control engine of the application, via the data store connection, retrieve a first set of configurations from the centralized hierarchical configuration data store, in response to a first query for configurations having a default environment name, a default instance name, and a default category name. The application may further retrieve a second set of configurations from the centralized hierarchical configuration data store, in response to a second query for configurations having the application environment, a default instance name, and a default category name. The application may further retrieve a third set of configurations from the centralized hierarchical configuration data store, in response to a third query for configurations having the application environment, the application instance, and a default category name. The application may further retrieve a fourth set of configurations from the centralized hierarchical configuration data store, in response to a fourth query for configurations having the application environment, the application instance, and the application category.

Another illustrative aspect described herein may provide a centralized hierarchical configuration system, which may include a centralized hierarchical configuration data store and an application having at least one processor and memory storing computer-readable instructions, that when executed by the at least one processor, may cause the application to load a plurality of server settings from an application server to obtain data store connection settings to the centralized hierarchical configuration data store, load a plurality of application settings to obtain a first attribute of the application and a second attribute of the application, and establish a data store connection to the centralized hierarchical configuration data store using the data store connection settings. The application may then, by a configuration control engine of the application, via the data store connection, retrieve a first set of configurations from the centralized hierarchical configuration data store, in response to a first query for configurations having a default first attribute and a default second attribute. The application may further retrieve a second set of configurations from the centralized hierarchical configuration data store, in response to a second query for configurations having the first attribute of the application and a default second attribute. The application may further retrieve a third set of configurations from the centralized hierarchical configuration data store, in response to a third query for configurations having the first attribute of the application and the second attribute of the application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and not limited in the accompanying figures in which like reference materials indicate similar elements and in which:

FIGS. 3A-C are illustrative examples of loading and applying configurations to example applications in an example networking computing system in accordance with one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed herein, entities, such as corporations, governments, universities, and the like, may host numerous applications in a distributed network. For instance, an entity may host multiple instances of an application to handle multiple users of the application. Further, the entity may host multiple instances of the application in different environments, such as Development, Testing, Production, etc. Using current mechanisms, the various instances of an application across many environments of the distributed network may be limited to using the same configurations. Configurations may be used to customize the runtime behavior of an application. As such, using current mechanisms, the various instances of an application across many environments of the distributed network may be constrained to having the same runtime behavior. Given these restrictions, different versions of an application may need to be written and deployed in order to provide customized behavior. For example, an entity may need to deploy Version 1 of Application A in a Development environment and Version 2 of Application A in a Production environment in order to customize the behavior of Application A based on the environment. In another example, an entity may need to deploy Version 1 of Application B in a Development environment and Version 2 of Application B in a Development environment in order to customize the behavior of Application B based on the instance. Thus, current mechanisms may lead to time-consuming and inefficient processes, higher resource consumption, as well as inaccuracies. Accordingly, systems described herein may relate to systems for configuring applications in a distributed environment to enable more granular customization of application behavior.

Figure 1:
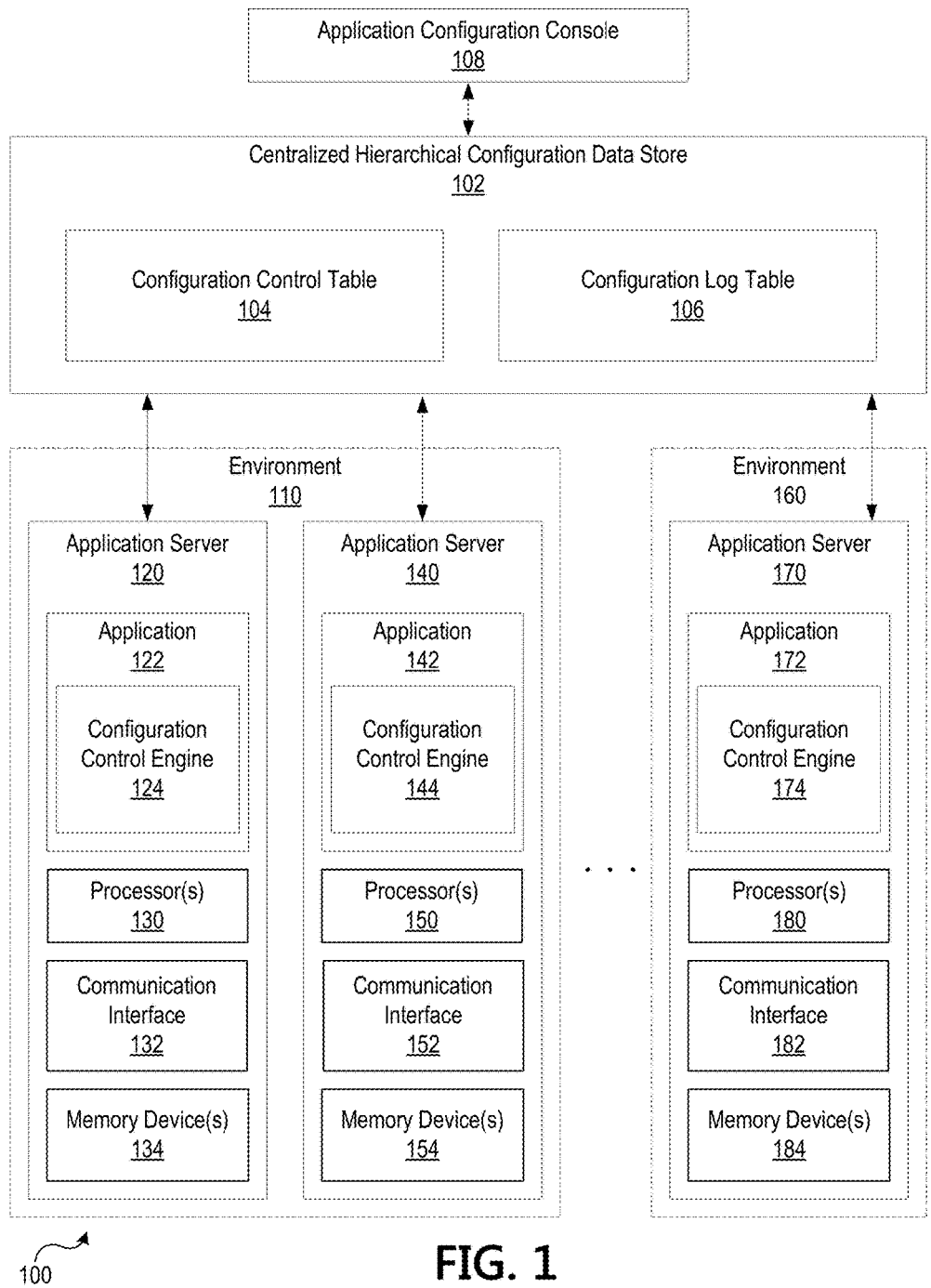
FIG. 1 is a block diagram of an illustrative networked computing system including an example centralized hierarchical configuration system in accordance with one or more aspects described herein.

FIG. 1 shows an illustrative networked computing system 100 (e.g., a centralized hierarchical configuration system) including a centralized hierarchical configuration data store 102, an application configuration console 108, and one or more application servers 120, 140, and 170. The application servers 120, 140, and 170 may be configured to provide a framework (e.g., a server environment) to run one or more applications 122, 142, and 172. As such, the application servers 120, 140, and 170 may provide services such as transaction management, load balancing, security, clustering, and failovers. In some examples, the application servers 120, 140, and 170 may act as a virtual machine for the applications 122, 142, and 172. As such, the application servers 120, 140, and 170 may also handle network communications, data store (e.g., database) connections, and so forth. In these examples, the application servers 120, 140, and 170 may include libraries (e.g., drivers) to handle interactions with the centralized hierarchical configuration data store 102. Example implementations of application servers will be described in further detail below. Further, the applications 122, 142, and 172 may be associated with an environment 110 and 160. It will be appreciated that a distributed network may include a plurality of environments, each including a plurality of application servers and applications. Thus, the example arrangement of environments, application servers, and applications shown in FIG. 1 is illustrative and other arrangements of environments, application servers, and applications may be used.

The centralized hierarchical configuration data store 102 (e.g., a database) may be used to store information related to the configuration of various applications in a distributed network. For example, the centralized hierarchical configuration data store 102 may store information corresponding to configurations based on environment, instance, category, and the like. As such, the centralized hierarchical configuration data store 102 may define configurations applicable to all applications in the distributed network, applications in particular environment, specific instances of an application, specific category of applications, or a combination thereof. The configurations may be managed as key/value pairs, where the key identifies the configuration and may be used to retrieve a value corresponding to the configuration.

In some examples, the centralized hierarchical configuration data store 102 may include a configuration control table. The configuration control table 104 may include information relating to the current configurations for the distributed environment. Configurations may be settings to control application behavior (e.g., during runtime, and the like). For example, configurations may define performance tuning (e.g., defining a thread pool), caching, logging, certificates (e.g., authentication certificates, and so forth), security and control, networking, and so forth. In other examples, configurations may be specific to the application context (e.g., application-specific rules, business rules, and the like). For instance, an application for saving and/or downloading content may consume configurations for a location (e.g., a file path) to which to save the content, a retention policy for the content, an archival policy for the content, a preferred format for the content, a maximum size of the content, and so forth. In another example, an application for presenting information to a user may consume a configuration for the text to display to a user in different scenarios (e.g., notifications, error messages, translations, and so forth). In another example, an application that retrieves content may consume configurations for connection settings, such that a data source, a retry delay, a polling interval, a timeout threshold, and so forth. It will be appreciated that the examples of configurations described above are not exhaustive, and configurations may govern other aspects of an application's behavior.

An application in the distributed network may use this information in determining its hierarchical configuration. As such, the configurations stored in the configuration control table 104 may include an environment name (e.g., default, Development, Testing, Production, and the like), an instance name (e.g., default, Instance 1, Instance 2, Instance 3, and the like), a category name (e.g., default, Category A, Category B, Category C, and the like), a configuration name (e.g., as a key for a key/value pair), a configuration value (e.g., as a value of the key/value pair), a configuration description, and a user name (e.g., the user who added the configuration, the user who last modified the configuration, and the like). The configuration control table 104 may be keyed by the environment name, the instance name, and the category name. Thus, the configuration control table 104 may return a list of configurations in response to a query based on a combination of an environment name, an instance name, and a category name.

In examples where a configuration is not specific to a particular environment, instance, and/or category, the configuration may have a default value for one or more of these keys. For instance, where a configuration is applicable to all applications, regardless of environment, instance, and category, the configuration may have a default environment name, a default instance name, and a default category name. In another example, where a configuration is applicable to a particular environment, regardless of instance and category, the configuration may specify an environment name, but may have a default instance and a default category. In another example, where a configuration is applicable to a particular environment and a particular instance, the configuration may specify an environment name and an instance name, but may have a default category.

In some examples, the centralized hierarchical configuration data store 102 may also include a configuration log table 106. The configuration log table 106 may include information relating to the history of the configurations for the distributed environment. As such, the configuration log table 106 may include information relating to the history of configurations in the configuration control table 104. Additionally, the configuration log table 106 may include information relating to the history of configurations deleted from the configuration control table 104. The centralized hierarchical configuration system 100 may use this information to perform rollbacks. For instance, where the latest update for a configuration caused a failure (e.g., caused one or more applications to crash, cause one or more applications to underperform, caused one or more applications to make errors, and the like), the centralized hierarchical configuration system 100 may replace the latest update for the configuration with the prior value(s) for the configuration. In another example, an administrator may elect to rollback the latest update to a configuration via the application configuration console 108. As such, the configuration log table 106 may include at least the information included in the configuration control table 104. For example, the configuration log table 106 may include an environment name, an instance name, a category name, a configuration name, a configuration value, a configuration description, and a user name. Additionally or alternatively, the configuration log table 106 may include a configuration change (e.g., the modified attribute of the configuration, and the like), a timestamp (e.g., the timestamp of the modification, and the like), a configuration old value (e.g., the previous value of the configuration), a configuration new value (e.g., the current value of the configuration), a reason (e.g., a reason for the modification, and the like), and an action (e.g., a recommendation for rollback of configuration in case of a failure, a recommendation of no rollback of configuration in case of a failure, and the like).

It will be appreciated that other database structures (e.g., additional/alternative tables, additional/alternative fields, and the like) may be used to store information related to the configuration of applications in the centralized hierarchical configuration data store 102.

The centralized hierarchical configuration system 100 may include an application configuration console 108. The application configuration console 108 may be configured to communicate with the centralized hierarchical configuration data store 102. The application configuration console 108 may provide an interface that enables administrators of the centralized hierarchical configuration system 100 to browse (e.g., an interface that provides a list of configurations), search (e.g., an interface that provides an option to search for one or more configurations by one or more of the attributes stored in the configuration control table 104 and/or the configuration log table 106), view (e.g., an interface that provides information relating to one configuration as found in the configuration control table 104 and/or the configuration log table 106), copy (e.g., an interface that provides an option to copy information relating to one or more configurations found in the configuration control table 104), download (e.g., an interface that provides an option to download information relating to one or more configurations as found in the configuration control table 104 and/or the configuration log table 106), insert (e.g., an interface that provides an option to add a new configuration to the configuration control table 104), upload (e.g., an interface that provides an option to add a plurality of new configurations to the configuration control table 104), update (e.g., an interface that provides an option to update information relating to an existing configuration in the configuration control table 104 and/or the configuration log table 106, and delete (e.g., an interface that provides an option to delete a configuration from the configuration control table 104) configurations stored in the centralized hierarchical configuration data store 102.

The interface may be a user interface device that permits the centralized hierarchical configuration system 100 to display information and/or solicit information, as well as accept one or more user interactions from a user of the user interface device. In some cases, the user interface may include a display and a distinct keypad. The display may be any suitable display. For instance, the display may include or may be a liquid crystal display (LCD), a fixed segment display, or a dot matrix LCD display. Additionally or alternatively, the display may be a touch screen LCD that functions both as a display and as a keypad. As such, the touch screen LCD may be adapted to display user interfaces to enable the administrator of the centralized hierarchical configuration system 100 to perform the functions described above. The interface may be, for example, a web browser, a desktop application, a mobile application, or the like that resides at a computing device. The application configuration console 108 may be in signal communication with the centralized hierarchical configuration data store 102 via a network. The network may include one or more of a wired network (e.g., the Internet), a wireless network (e.g., a cellular network, Bluetooth, NFC), or a combination of wired and wireless networks.

In some examples, the computing device may be a mobile device. The mobile device may be, for example, a mobile phone, a personal digital assistant (PDA), or a tablet computer. Software applications executing on the mobile device may be configured to communicate with the centralized hierarchical configuration data store 102 to read and/or write information relating to the configurations stored therein. In some examples, the mobile device may communicate with the centralized hierarchical configuration data store 102 via a mobile browser installed on the mobile device. In other examples, the mobile device may communicate with the centralized hierarchical configuration data store 102 via a centralized hierarchical configuration mobile application (e.g., an iOS application, an Android application, and so forth) installed on the mobile device. The mobile device may be in communication with the centralized hierarchical configuration data store 102 via a network such as those described above. As such, the mobile device may include an antenna configured for communication with the centralized hierarchical configuration data store 102.

The applications servers 120, 140, and 170 and the applications 122, 142, and 172 may include various components, modules, and sub-systems to support configuring applications 122, 142, and 172 to enable more granular customization of application behavior. The application servers 120, 140, and 170, in this example, include an application 122, 142, and 172, one or more processors 130, 150, and 180, a communication interface 132, 152, and 182, and one or more memory devices 134, 154, and 184. Further, in this example, the applications 122, 142, and 172 may include a configuration control engine 124, 144, and 174. The applications servers 120, 140, and 170 may be implemented using a special purpose computing device (or computing devices) that have been specially configured to perform functionality according to one or more aspects of the present disclosure.

The one or more processors 130, 150, and 180 (e.g., microprocessors, microcontrollers, and the like) of the application servers 120, 140, and 170 may operate by using an algorithm that facilitates communicating with the centralized hierarchical configuration data store 102, and creating a hierarchical configuration for the applications 122, 142, and 172 based on the information received from the centralized hierarchical configuration data store 102. This algorithm may be included as instructions stored in the one or more memory devices 134, 154, and 184, and may be included as a portion of the configuration control engine 124, 144, 174. The one or more processors 130, 150, and 180 may operate, for example, by requesting and receiving information from the centralized hierarchical configuration data store 102, and processing the information to determine an appropriate configuration for an application 122, 142, and 172 based on the environment associated with the application server 120, 140, and 170, the application instance, and. An illustrative algorithm will be described below with reference to FIG. 2.

In an example, the one or more processors 130, 150, and 180 may configure to operate the algorithm and/or the application 122, 142, and 172 using an operating system (e.g., Windows, Linux, UNIX, GNU, OS X, iOS, Android, and the like). In some cases, the memory devices 134, 154, and 184 may be communicatively coupled to the one or more processors 130, 150 and 180, such as via a data bus. The one or more memory devices 134, 154, and 184 may be used to store desired information, such as the aforementioned algorithm, computer executable instructions to implement the business rules for enabling a hierarchical configuration for applications, a backup of the current configuration of an application (e.g., some or all configurations stored in the centralized hierarchical configuration data store 102 may be cached in the memory devices 134, 154, and 184), and/or the like. The one or more memory devices 134, and 154, and 184 may be any suitable type of storage including, but not limited to, RAM, ROM, EPROM, flash memory, a hard drive, and the like. In some examples, the one or more processors 130, 150, and 180 may store information within the one or more memory devices 134, 154, and 184, and may subsequently retrieve the stored information.

The communication interface 132, 152, and 182 may facilitate communication between the application servers 120, 140, 170 and the centralized hierarchical configuration data store 102 via a network using one or more wired or wireless communication links. The application servers 120, 140, 170 may communicate, via the one or more wired or wireless communication links over the network, with the centralized hierarchical configuration data store 102. For example, the application servers 120, 140, 170 may include one or more computing devices that may be communicatively coupled to a network. The network may be communicatively coupled to one or more devices, such as to servers associated with the centralized hierarchical configuration data store 102. The network may include one or more wired and/or wireless networks, such as a telecommunications network (e.g., a cellular network, a land line network, a cable network, and the like), a Wi-Fi network, a local area network (LAN), a wide area network (WAN), the Internet, and the like. When used in a LAN networking environment, the application servers 120, 140, and 170 may be connected to the LAN through a network interface or an adapter that may be included as a portion of the communication interface 138. When used in a WAN networking environment, the application servers 120, 140, and 170 may include a modem and/or other means for establishing wired and/or wireless communication over the WAN, such as the Internet. It will be appreciated that the network connections discussed above are illustrative and other means of establishing a communications link between the application servers 120, 140, and 170 and the centralized hierarchical configuration data store 102 may include one or more various protocols such as TCP/IP, Ethernet, FTP, HTTP, and the like.

Example implementations of the configuration control engine 124, 144, and 174 as illustrated in FIG. 1 will be described in further detail below with reference to FIG. 2. Further, as noted above, the components of centralized hierarchical configuration system 100 as described with reference to FIG. 1 are provided by way of example only and other implementations of a centralized hierarchical configuration system 100 may include additional or alternative arrangements, components, sub-systems, engines, and so forth.

Figure 2:
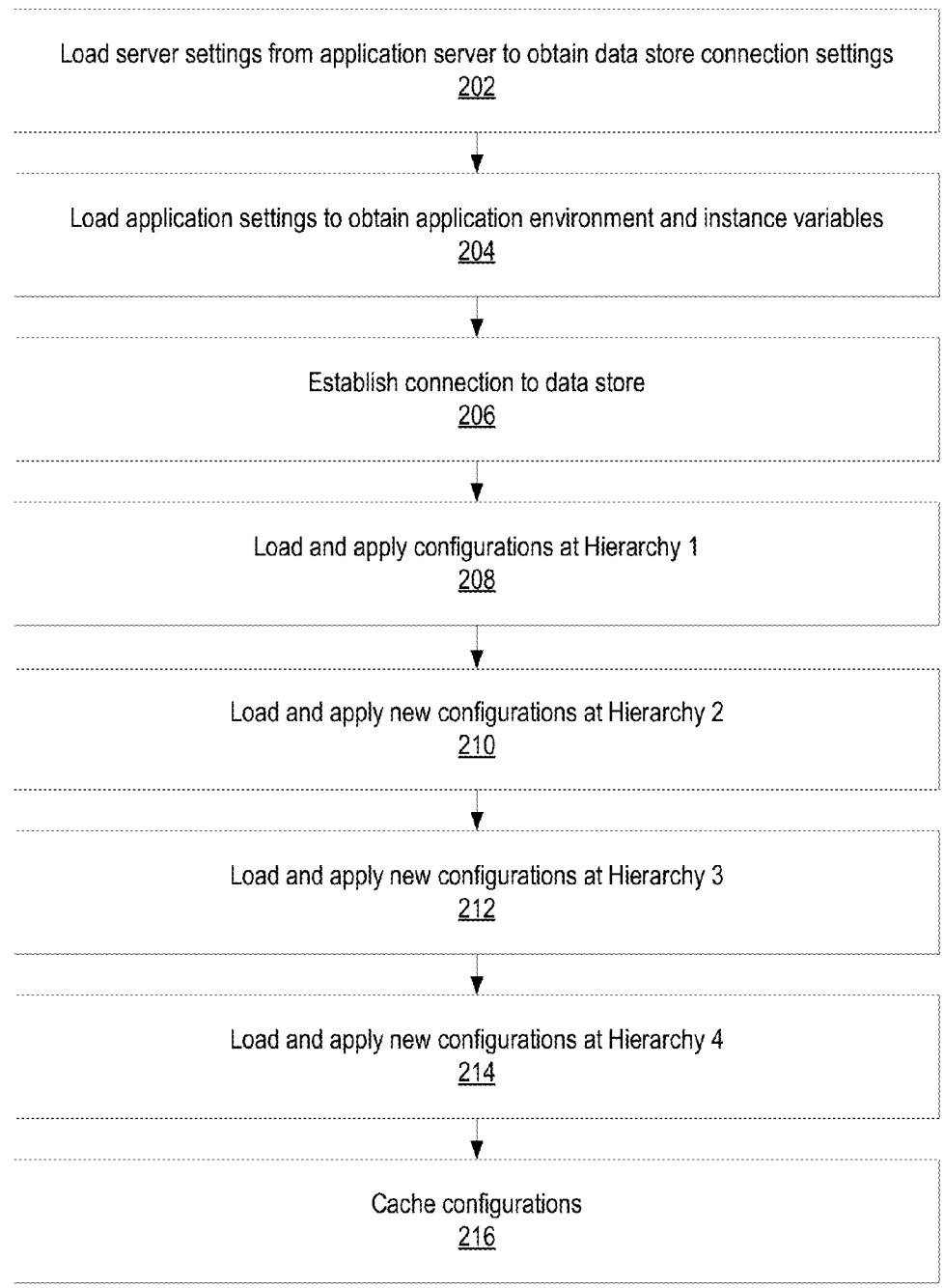
FIG. 2 is a flowchart of an illustrative method for loading and applying configurations to an application in a networked computing system in accordance with one or more aspects described herein.

Referring now to FIG. 2, a flowchart 200 of an illustrative method for loading and applying configurations to an application in a distributed computing system is shown. The various components of the centralized hierarchical configuration system 100 may be used to perform these method steps. In some examples, the configuration control engine 124, 144, and 174 may be configured, in operation, to perform the method steps discussed herein.

At step 202, the configuration control engine 124, 144, and 174 of an application server 120, 140, and 170 may be configured, in operation, to load server settings from the application server 120, 140, and 170 to obtain data store connection settings. In some examples, the configuration control engine 124, 144, and 174 may load server settings at startup of the application server 120, 140, and 170. In other examples, the configuration control engine 124, 144, and 174 may periodically load server settings. In further examples, the configuration control engine 124, 144, and 174 may load server settings in response to an administrator request (e.g., via the application configuration console 108) or in response to a change in the server settings. The server settings may be stored on the one or more memory devices 134, 154, and 184 of the application server 120, 140, and 170. Further, the server settings may be stored in various formats including, but not limited to, an XML file, a JSON file, a YAML file, an INI file, a Shell script, and the like. The data store connection settings may instruct the application server 120, 140, and 170 how to communicate with the centralized hierarchical configuration data store 102. As such, the data store connection settings may include a plurality of connection parameters including, but not limited to, a host name of a data store server (e.g., localhost, an IP address, a domain name, and the like), a port number that the data store server is listening on (e.g., 5432, 12345, and the like), and a data store name (e.g., configurationDB, and the like). Additionally, the data store connection settings may include some or all of the following connection parameters: a data store user on whose behalf the connection is being made (e.g., a username), a password for the data store user, a data store connection class and/or factory, a data store driver class name, an indicator of whether to use a Secure Sockets Layer (SSL), a plurality of SSL settings where the indicator is true (e.g., an SSL class name, an SSL mode, a path to an SSL root certificate, a path to an SSL certificate, a path to an SSL key, an SSL host name verifier class name, an SSL password provider class name, and so forth), a buffer size (e.g., a sending buffer size, a receiving buffer size), a protocol version (e.g., a version number), a log level (e.g., INFO, DEBUG, ERROR, FATAL, WARN, ALL, and the like), a character set (e.g., a character set to be used for information sent to the data store server, a character set to be used for information received from the data store server), a default row fetch size, a timeout threshold (e.g., a login timeout, a connection timeout, a socket timeout, and the like), and an indicator of whether the connection is read-only. Additionally or alternative, the data store connection settings may include information relating to pooling data store connections including, but not limited to, a maximum number of data store connections in a pool, a minimum number of data store connections in the pool, a maximum number of idle data store connections to retain in the pool, and a maximum wait time for a data store connection to become available (e.g., in milliseconds). In examples where pooling is used, the data store connection settings may specify a data store connection class that supports pooling.

It will be appreciated that the above list of connection parameters is not exhaustive, and may include additional or alternative connection parameters. Further, the connection parameters specified in the data store connection settings may be based on the operating system of the application server 120, 140, and 170, the type of the application server 120, 140, and 170, the type of the application 122, 142, and 172 being run by the application server 120, 140, and 170, the operating system of the data store server, and/or the type of the data store server. As such, the format and structure of the file including the server settings may be dictated by the type of the application server 120, 140, and 170 and/or the type of the application 122, 142, and 172. For example, the type of the application server 120, 140, and 170 and/or the type of the application 122, 142, and 172 may dictate that the file including the server settings be an XML file, and may further provide an XML schema (e.g., an XML Schema Definition (XSD)). The XSD may describe the required and optional parameters (e.g., the connection parameters described above) to be included in the XML file in order to establish a data store connection with the centralized hierarchical configuration data store 102.

In some examples, the data store connection settings will include a plurality of sets of connection parameters. For instance, each set of connection parameters may be attributed to a different data store server, different connection permissions (e.g., read-only, read/write), and so forth. As such, in some examples, the application server 120, 140, and 170 may define a preferred order of data store connection settings. In these examples, the application server 120, 140, and 170 may first attempt to connect to the centralized hierarchical configuration data store 102 using a first set of connection parameters. If the first set does not yield a successful data store connection, the application server 120, 140, and 170 may attempt to connect to the centralized hierarchical configuration data store 102 using a second set of connection parameters, and so forth. As such, the application server 120, 140, and 170 may define failover mechanisms in situations where a particular data store server is unavailable (e.g., during scheduled maintenance, data store server has reached its maximum capacity, and the like).

At step 204, the configuration control engine 124, 144, and 174 of the application server 120, 140, and 170 may be configured, in operation, to load application settings. In some examples, the application settings may include an environment (e.g., an environment ID, an environment name, and the like) to which the application 122, 142, and 172 is associated and an instance (e.g., an instance ID, an instance name, and the like). The configuration control engine 124, 144, and 174 may load the application settings at startup of the application 122, 142, and 172. The application settings may be stored on the one or more memory devices 134, 154, and 184 of the application server 120, 140, and 170. In particular, the application settings may be a file in the directory where the application code resides on the application server 120, 140, and 170. The application settings may be stored in various formats including, but not limited to, an XML file, a JSON file, a YAML file, an INT file, a Shell script, and the like. The configuration control engine 124, 144, and 174 may use the environment and instance defined in the application settings to retrieve one or more configurations from the centralized hierarchical configuration data store 102.

At step 206, the application server 120, 140, and 170 may establish a connection to the centralized hierarchical configuration data store 102. As such, the application server 120, 140, and 170 may use the server settings loaded by the configuration control engine 124, 144, and 174 to establish a data store connection. In examples where the centralized hierarchical configuration data store 102 is a database, the connection may be a database connection. Once a connection is established, the application server 120, 140, and 170 is ready to retrieve configurations from the centralized hierarchical configuration data store 102.

In steps 208-214, the configuration control engine 124, 144, and 174 may retrieve a plurality of sets of configurations from the centralized hierarchical configuration data store 102 using the data store connection established in step 206. More specifically, the configuration control engine 124, 144, and 174 may retrieve a plurality of configurations from the configuration control table 104. As described above, the configuration control table 104 may be keyed by an environment name, an instance name, and a category name. As such, the configuration control engine 124, 144, and 174 may submit, via the application server 120, 140, and 170, a plurality of queries to the configuration control table 104 of the centralized hierarchical configuration data store 102 (e.g., SQL queries to a database, and the like) based, at least in part, on an environment name, an instance name, and a category name. In response to the plurality of queries, the centralized hierarchical configuration data store 102 may return to the application server 120, 140, and 170 a plurality of sets of configurations. The application server 120, 140, and 170 may communicate the received plurality of sets of configurations to the configuration control engine 124, 144, and 174 for further processing (e.g., determining how to apply the configurations to the application 122, 142, and 172, applying the configurations to the application 122, 142, and 172, caching the configurations to the one or more memory devices 134, 154, and 184 of the application server 120, 140, and 170, and the like). Example implementations of steps 208-214 are described in further detail below.

At step 208, the configuration control engine 124, 144, and 174 may retrieve a first set of configurations from the centralized hierarchical configuration data store 102 using the data store connection established in step 206. In some examples, the first set of configurations may include configurations applicable to all applications in the distributed network. As such, the first set of configurations may be retrieved in response to a query for configurations having a default environment name, a default instance name, and a default category name. Thus, the first set of configurations may correspond to a first level of hierarchy. The configuration control engine 124, 144, and 174 may instruct the application 122, 142, and 172 to apply the first set of configurations.

At step 210, the configuration control engine 124, 144, and 174 may retrieve a second set of configurations from the centralized hierarchical configuration data store 102 using the data store connection established in step 206. In some examples, the second set of configurations may include configurations applicable to applications in a particular environment. As such, the second set of configurations may be retrieved in response to a query for configurations having a particular environment name, a default instance name, and a default category name. Thus, the second set of configurations may correspond to a second level of hierarchy. As such, the configuration control engine 124, 144, and 174 may instruct the application 122, 142, and 172 to replace configurations at a lower level of hierarchy (e.g., configurations in the first set of configurations) with conflicting configurations at a higher level of hierarchy (e.g., the second set of configurations). For instance, where the second set of configurations includes a configuration that was retrieved in the first set of configurations, the configuration control engine 124, 144, and 174 may instruct the application 122, 142, and 172 to pull in the configuration value based on the second set of configurations, instead of the configuration value based on the first set of configurations.

At step 212, the configuration control engine 124, 144, and 174 may retrieve a third set of configurations from the centralized hierarchical configuration data store 102 using the data store connection established in step 206. In some examples, the third set of configurations may include configurations applicable to a particular instance of an application in a particular environment. As such, the third set of configurations may be retrieved in response to a query for configurations having a particular environment name, a particular instance name, and a default category name. Thus, the third set of configurations may correspond to a third level of hierarchy. As such, the configuration control engine 124, 144, and 174 may instruct the application 122, 142, and 172 to replace configurations at a lower level of hierarchy (e.g., configurations in the first and/or second sets of configurations) with conflicting configurations at a higher level of hierarchy (e.g., the third set of configurations). For instance, when the third set of configurations includes a configuration that was retrieved in the first and/or second sets of configurations, the configuration control engine 124, 144, and 174 may instruct the application 122, 142, and 172 to pull in the configuration based on the third set of configurations, instead of the configuration value based on the first and/or second sets of configurations.

At step 214, the configuration control engine 124, 144, and 174 may retrieve a fourth set of configurations from the centralized hierarchical configuration data store 102 using the data store connection established in step 206. In some examples, the fourth set of configurations may include a particular category of configurations applicable to a particular instance of an application in a particular environment. As such, the fourth set of configurations may be retrieved in response to a query for configurations having a particular environment name, a particular instance name, and a particular category name. Thus, the fourth set of configurations may correspond to a fourth level of hierarchy. As such, the configuration control engine 124, 144, and 174 may instruct the application 122, 142, and 172 to replace configurations at a lower level of hierarchy (e.g., configurations in the first, second, and/or third sets of configurations) with conflicting configurations at a higher level of hierarchy (e.g., the fourth set of configurations). For instance, when the fourth set of configurations includes a configuration that was retrieved in the first, second, and/or third sets of configurations, the configuration control engine 124, 144, and 174 may instruct the application 122, 142, and 172 to pull in the configuration based on the fourth set of configurations, instead of the configuration value based on the first, second, and/or third sets of configurations.

Further, other example implementations of a centralized hierarchical configuration system 100 may associate alternate application attributes to the levels of hierarchy. For instance, an example centralized hierarchical configuration system 100 including a four-level hierarchical configuration system may define a second level of hierarchy as an application name instead of an instance name. In these examples, the centralized hierarchical configuration data store 102 may store configuration information based on the alternate application attributes.

The configuration control engine 124, 144, and 174 may execute steps 208-214 upon startup of the application 122, 142, and 172. Additionally or alternatively, the configuration control engine 124, 144, and 174 may execute steps 208-214 periodically, in response to an administrator request (e.g., via the application configuration console 108), and/or in response to a change in the configurations in the centralized hierarchical configuration data store 102.

At step 216, the configuration control engine 124, 144, and 174 may cache the configurations resulting from steps 208-212. Caching the configurations may advantageously enable the application 122, 142, and 172 to access the configurations in the event of unavailability of the centralized hierarchical configuration data store 102. In some examples, the configurations may be cached to the one or more memory devices 134, 154, and 184.

Referring now to FIGS. 3A-C, illustrative examples of loading and applying configurations to example applications in an example networking computing system are shown. FIGS. 3A-C are illustrative examples of loading and applying configurations to example applications in an example networking computing system in accordance with one or more aspects described herein. FIG. 3A provides example configurations in an example configuration control table 104. FIG. 3B provides an example distributed network including example application servers running example applications, where the application servers are associated with example environments. Further, the applications include example categories. FIG. 3C provides the example configurations loaded and applied to each of the applications shown in FIG. 3B based on the example configurations in the example property log table 104 as shown in FIG. 3A. Thus, FIG. 3C illustrates loading and applying configurations in accordance with the process described with respect to FIG. 2.

As shown in FIG. 3C, in accordance with step 208, the configuration control engines 124, 144, and 174 of application servers 120, 140, and 170 may retrieve a first set of configurations. In this example, the configuration control engine 124 may retrieve configurations having a default environment name, a default instance name, and a default category name. As such, in this example, the configuration control engine 124 may retrieve Value1 for PropertyA, Value2 for PropertyB, and Value3 for PropertyC. The configuration control engine 124 may instruct the application 122 to use Value1 for PropertyA, Value2 for PropertyB, and Value3 for PropertyC. Similarly, the configuration control engine 144 of application server 140 may retrieve Value1 for PropertyA, Value2 for PropertyB, and Value3 for PropertyC, and may instruct the application 142 to use Value1 for PropertyA, Value2 for PropertyB, and Value3 for PropertyC. Likewise, the configuration control engine 174 of application server 170 may retrieve Value1 for PropertyA, Value2 for PropertyB, and Value3 for PropertyC, and may instruct the application 172 to use Value1 for PropertyA, Value2 for PropertyB, and Value3 for PropertyC.

In accordance with step 210, the configuration control engines 124, 144, and 174 of application servers 120, 140, and 170 may retrieve a second set of configurations. In this example, the configuration control engine 124 may retrieve configurations having a Development environment, a default instance name, and a default category name. As such, in this example, the configuration control engine 124 may retrieve Value4 for PropertyA, and Value5 for PropertyC. Thus, the configuration control engine 124 may instruct the application 122 to use Value4 for PropertyA instead of Value1, and Value5 for PropertyC instead of Value3. Similarly, the configuration control engine 144 of application server 140 may retrieve Value4 for PropertyA, and Value5 for PropertyC, and thus, may instruct the application 142 to use Value4 for PropertyA and Value5 for PropertyC. In this example, the configuration control engine 174 of application server 170 may retrieve configurations having a Production environment, a default instance name, and a default category name. As such, in this example, the configuration control engine 174 may retrieve Value6 for PropertyB. Thus, configuration control engine 174 may instruct the application 172 to use Value6 for PropertyB instead of Value2.

In accordance with step 212, the configuration control engines 124, 144, and 174 of application servers 120, 140, and 170 may retrieve a third set of configurations. In this example, the configuration control engine 124 may retrieve configurations having a Development environment, an Instance1 instance name, and a default category name. As such, in this example, the configuration control engine 124 may retrieve Value7 for PropertyB. Thus, the configuration control engine 124 may instruct the application 122 to use Value7 for PropertyB instead of Value2. In this example, the configuration control engine 144 may retrieve configurations having a Development environment, an Instance2 instance name, and a default category name. As such, in this example, the configuration control engine 144 may retrieve Value8 for PropertyA. Thus, the configuration control engine 144 may instruct the application 142 to use Value8 for PropertyA instead of Value4. In this example, the configuration control engine 174 may retrieve configurations having a Production environment, an Instance3 instance name, and a default category name. As such, in this example, the configuration control engine 174 may retrieve no configurations. Thus, the configuration control engine 174 may instruct the application 172 to use the configuration values based on the first and second sets of configurations.

In accordance with step 214, the configuration control engines 124, 144, and 174 of application servers 120, 140, and 170 may retrieve a fourth set of configurations. In this example, the configuration control engine 124 may retrieve configurations having a Development environment, an Instance1 instance name, and a CategoryA category name and/or a CategoryB category name. As such, in this example, the configuration control engine 124 may retrieve Value10 for PropertyC as it applies to CategoryA. Thus, the configuration control engine 124 may instruct the application 122 to use Value10 for PropertyC as it applies to CategoryA instead of Value5. In this example, the configuration control engine 144 may retrieve configurations having a Development environment, and Instance2 instance name, and a CategoryA category name and/or a CategoryB category name. As such, in this example, the configuration control engine 144 may retrieve Value 11 for PropertyB as it applies to CategoryB. Thus, the configuration control engine 144 may instruct the application 142 to use Value11 for PropertyB as is applies to CategoryB instead of Value2. In this example, the configuration control engine 174 may retrieve configurations having a Production environment, an Instance3 instance name, and a CategoryA category name. As such, in this example, the configuration control engine 174 may retrieve Value9 for PropertyA as it applies to CategoryA. Thus, the configuration control engine 174 may instruct the application 172 to use Value9 for PropertyA as it applies to CategoryA instead of Value1.

While the disclosure has been described with respect to specific examples including presently illustrative modes of carrying out the disclosure, a person having ordinary skill in the art, after review of the entirety enclosed herein, will appreciate that there are numerous variations and permutations of the above-described systems and techniques that fall within the spirit and scope of the disclosure. For example, while some embodiments refer to a four-level configuration hierarchy, the disclosure is meant to include, as appropriate, additional or alternative levels of hierarchy.

What is claimed is:

1. A centralized hierarchical configuration system, comprising:
a centralized hierarchical configuration data store; and
an application server having at least one processor and memory storing computer-readable instructions, that when executed by the at least one processor, cause the application server to:
load a plurality of server settings to obtain data store connection settings to the centralized hierarchical configuration data store;
load a plurality of application settings to obtain an application environment, an application instance, and an application category associated with an application;
establish a data store connection, via a communication interface of the application server, to the centralized hierarchical configuration data store using the data store connection settings;
retrieve, by a configuration control engine of the application server, via the data store connection, a first set of configurations from the centralized hierarchical configuration data store in response to a first query for configurations having a default environment name, a default instance name, and a default category name, the first set of configurations including a first plurality of configurations including settings to control application behavior of the application;
retrieve, by the configuration control engine, via the data store connection, a second set of configurations from the centralized hierarchical configuration data store in response to a second query for configurations having the application environment, a default instance name, and a default category name, the second set of configurations including a second plurality of configurations including settings to control application behavior of the application;
retrieve, by the configuration control engine, via the data store connection, a third set of configurations from the centralized hierarchical configuration data store in response to a third query for configurations having the application environment, the application instance, and a default category name, the third set of configurations including a third plurality of configurations including settings to control application behavior of the application;
retrieve, by the configuration control engine, via the data store connection, a fourth set of configurations from the centralized hierarchical configuration data store in response to a fourth query for configurations having the application environment, the application instance, and the application category, the fourth set of configurations including a fourth plurality of configurations including settings to control application behavior of the application;

determine, by the application server, that a higher set of configurations includes a configuration of a corresponding plurality of configurations that was retrieved in a lower set of configurations; and responsive to determining that the higher set of configurations includes a configuration of the corresponding plurality of configurations that was retrieved in a lower set of configurations, replace a value of the configuration in the lower set of configurations with a value of a configuration from the higher set of configurations, wherein the first set of configurations corresponds to a first level of hierarchy, the second set of configurations corresponds to a second level of hierarchy higher than the first level of hierarchy, the third set of configurations corresponds to a third level of hierarchy higher than the first level of hierarchy and the second level of hierarchy, and the fourth set of configurations corresponds to a fourth level of hierarchy higher than the first level of hierarchy, the second level of hierarchy and the third level of hierarchy wherein the centralized hierarchical configuration data store includes a configuration control table that includes information relating to a plurality of configurations, and wherein the configuration control table of the centralized hierarchical configuration data store is keyed by a plurality of application environments, a plurality of application instances, and a plurality of application categories.

2. The centralized hierarchical configuration system of claim 1, wherein the instructions, when executed by the at least one processor, further cause the application server to:
store the first set of configurations, the second set of configurations, the third set of configurations, and the fourth set of configurations in a cache of the application server.

3. The centralized hierarchical configuration system of claim 2, where the instructions, when executed by the at least one processor, further cause the application server to:
retrieve the first set of configurations, the second set of configurations, the third set of configurations, and the fourth set of configurations from the cache of the application server in an event that the centralized hierarchical configuration data store is unavailable.

4. The centralized hierarchical configuration system of claim 1, wherein the centralized hierarchical configuration data store includes a configuration log table that includes information relating to a history of the plurality of configurations of the configuration control table.

5. The centralized hierarchical configuration system of claim 1, wherein the application retrieves the first set of configurations, the second set of configurations, the third set of configurations, and the fourth set of configurations in response to startup of the application.

6. The centralized hierarchical configuration system of claim 1, wherein the application retrieves the first set of configurations, the second set of configurations, the third set of configurations, and the fourth set of configurations in response to a change in the plurality of configurations stored in the configuration control table of the centralized hierarchical data store.

7. A centralized hierarchical configuration system, comprising:
a centralized hierarchical configuration data store; and
an application server having at least one processor and memory storing computer-readable instructions, that when executed by the at least one processor, cause the application server to:
load a plurality of server settings to obtain data store connection settings to the centralized hierarchical configuration data store;
load a plurality of application settings to obtain a first attribute of the application and a second attribute of an application;
establish a data store connection to the centralized hierarchical configuration data store using the data store connection settings;
retrieve, by a configuration control engine of the application, via the data store connection, a first set of configurations from the centralized hierarchical configuration data store in response to a first query for configurations having a default first attribute and a default second attribute, the first set of configurations including a first plurality of configurations including settings to control application behavior of the application; and
retrieve, by the configuration control engine, via the data store connection, a second set of configurations from the centralized hierarchical configuration data store in response to a second query for configurations having the first attribute of the application and a default second attribute, the second set of configurations including a second plurality of configurations including settings to control application behavior of the application;
retrieve, by the configuration control engine, via the data store connection, a third set of configurations from the centralized hierarchical configuration data store in response to a third query for configurations having the first attribute of the application and the second attribute of the application, the third set of configurations including a third plurality of configurations including settings to control application behavior of the application;
determine, by the application server, that a higher set of configurations includes a configuration of a corresponding plurality of configurations that was retrieved in a lower set of configurations; and
responsive to determining that the higher set of configurations includes a configuration of the corresponding plurality of configurations that was retrieved in a lower set of configurations, replace a value of the configuration in the lower set of configurations with a value of a configuration from the higher set of configurations,
wherein the first set of configurations corresponds to a first level of hierarchy, the second set of configurations corresponds to a second level of hierarchy higher than the first level of hierarchy, and the third set of configurations corresponds to a third level of hierarchy higher than the second level of hierarchy and the first level of hierarchy, wherein the centralized hierarchical configuration data store includes a configuration control table that includes information relating to a plurality of configurations, and wherein the configuration control table of the centralized hierarchical configuration data store is keyed by a plurality of application environments, a plurality of application instances, and a plurality of application categories.

8. A method of configuring applications, comprising:

loading, by an application, a plurality of server settings from an application server to obtain data store connection settings to a centralized hierarchical configuration data store;

loading, by the application, a plurality of application settings to obtain an application environment, an application instance, and an application category associated with the application;

establishing a data store connection to the centralized hierarchical configuration data store using the data store connection settings;

retrieving, by a configuration control engine of the application, via the data store connection, a first set of configurations from the centralized hierarchical configuration data store in response to a first query for configurations having a default environment name, a default instance name, and a default category name, the first set of configurations including a first plurality of configurations including settings to control application behavior of the application;

retrieving, by the configuration control engine, via the data store connection, a second set of configurations from the centralized hierarchical configuration data store in response to a second query for configurations having the application environment, a default instance name, and a default category name, the second set of configurations including a second plurality of configurations including settings to control application behavior of the application;

retrieving, by the configuration control engine, via the data store connection, a third set of configurations from the centralized hierarchical configuration data store in response to a third query for configurations having the application environment, the application instance, and a default category name, the third set of configurations including a third plurality of configurations including settings to control application behavior of the application;

retrieving, by the configuration control engine, a fourth set of configurations from the centralized hierarchical configuration data store in response to a fourth query for configurations having the application environment, the application instance, and the application category, the fourth set of configurations including a fourth plurality of configurations including settings to control application behavior of the application;

determining, by the configuration control engine, that a higher set of configurations includes a configuration of a corresponding plurality of configurations that was retrieved in a lower set of configurations; and responsive to determining that the higher set of configurations includes a configuration of the corresponding plurality of configurations that was retrieved in a lower set of configurations, replacing a value of the configuration in the lower set of configurations with a value of a configuration from the higher set of configurations, wherein the first set of configurations corresponds to a first level of hierarchy, the second set of configurations corresponds to a second level of hierarchy higher than the first level of hierarchy, the third set of configurations corresponds to a third level of hierarchy higher than the first level of hierarchy and the second level of hierarchy, and the fourth set of configurations corresponds to a fourth level of hierarchy higher than the first level of hierarchy, the second level of hierarchy and the third level of hierarchy, wherein the centralized hierarchical configuration data store includes a configuration control table that includes information relating to a plurality of configurations, and wherein the configuration control table of the centralized hierarchical configuration data store is keyed by a plurality of application environments, a plurality of application instances, and a plurality of application categories.

9. The method of claim 8, further comprising:

storing the first set of configurations, the second set of configurations, the third set of configurations, and the fourth set of configurations in a cache of the application server.

10. The method of claim 9, further comprising:

retrieving the first set of configurations, the second set of configurations, the third set of configurations, and the fourth set of configurations from the cache of the application server in the event that the centralized hierarchical configuration data store is unavailable.

11. The method of claim 8, wherein the centralized hierarchical configuration data store includes a configuration log table that includes information relating to a history of the plurality of configurations of the configuration control table.

* * * * *

UNITED STATES PATENT AND TRADEMARK OFFICE
CERTIFICATE OF CORRECTION

PATENT NO. : 10,459,905 B2
APPLICATION NO. : 14/990394
DATED : October 29, 2019
INVENTOR(S) : Floyd et al.

Page 1 of 1

It is certified that error appears in the above-identified patent and that said Letters Patent is hereby corrected as shown below:

In the Claims

Column 15, Line 28:
In Claim 1, after "hierarchy", insert --,--

Column 15, Line 47:
In Claim 3, delete "where" and insert --wherein--

Signed and Sealed this
Twenty-second Day of December, 2020

Andrei Iancu
*Director of the United States Patent and Trademark Office*